US012771243B2

(12) United States Patent
Chen et al.

(10) Patent No.: US 12,771,243 B2
(45) Date of Patent: Oct. 20, 2026

(54) AUTOMOTIVE POWER SYSTEMS WITH NOISE MITIGATION

(71) Applicant: Ford Global Technologies, LLC, Dearborn, MI (US)

(72) Inventors: Chingchi Chen, Ann Arbor, MI (US); Hongjie Wu, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 67 days.

(21) Appl. No.: 18/541,698

(22) Filed: Dec. 15, 2023

(65) Prior Publication Data

US 2025/0202348 A1 Jun. 19, 2025

(51) Int. Cl.

*H02M 1/44* (2007.01)
*H02M 1/14* (2006.01)
*H02M 1/34* (2007.01)

(52) U.S. Cl.

CPC ............... *H02M 1/44* (2013.01); *H02M 1/14* (2013.01); *H02M 1/34* (2013.01)

(58) Field of Classification Search

CPC ............. H02M 1/14; H02M 1/34; H02M 1/44
See application file for complete search history.

(56) References Cited

U.S. PATENT DOCUMENTS 5,907,479 A * 5/1999 Leu ..................... H02M 3/3353 363/21.08
8,285,217 B1 10/2012 Rockway et al.
8,718,578 B2 5/2014 Adler et al.
10,177,649 B1 * 1/2019 Ke .......................... H02M 1/32
2021/0075340 A1 * 3/2021 Hayashi ............ H02M 3/33523
2021/0262586 A1 * 8/2021 Nagano ............... F16K 37/0041

FOREIGN PATENT DOCUMENTS

JP 2020102693 A 7/2020
KR 101489565 B1 2/2015

* cited by examiner

*Primary Examiner* — Ryan Johnson
*Assistant Examiner* — Esayas G Yeshaw
(74) *Attorney, Agent, or Firm* — David B. Kelley; Brooks Kushman P.C.

(57) ABSTRACT

A switch mode power converter, in one example, includes a transformer with a primary coil and a pair of secondary coils in phase with the primary coil, and a pair of output circuits defining a pair of opposite polarity outputs. Each of the output circuits includes a rectifying diode having an anode directly connected with a dotted terminal of one of the secondary coils such that electromagnetic noise generated by the rectifying diodes at least partially cancels.

19 Claims, 4 Drawing Sheets

AUTOMOTIVE POWER SYSTEMS WITH NOISE MITIGATION

TECHNICAL FIELD

This disclosure relates to automotive power systems.

BACKGROUND

Automotive power systems may include functionally diverse electric subsystems such as switch mode power converters.

SUMMARY

Automotive power electronics has a switch mode power converter including a transformer with a primary coil and a pair of secondary coils in phase with the primary coil, and a pair of output circuits defining a pair of opposite polarity outputs, each of the output circuits including a rectifying diode having an anode directly connected with a dotted terminal of one of the secondary coils such that electromagnetic noise generated by the rectifying diodes at least partially cancels.

Automotive power electronics has a switch mode power converter including a transformer with a primary coil and a pair of secondary coils in phase with the primary coil, and a pair of output circuits defining a pair of same polarity outputs, one of the output circuits including a rectifying diode having an anode directly connected with a non-dotted terminal of one of the secondary coils and the other of the output circuits including a rectifying diode having a cathode directly connected with a dotted terminal of the other of the output circuits such that electromagnetic noise generated by the rectifying diodes at least partially cancels.

Automotive power electronics has a switch mode power converter including a pair of output circuits each with an output and a rectifying diode arranged such that electromagnetic noise generated by the rectifying diodes at least partially cancels.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure includes example designs that reduce electromagnetic noise present at certain positions within a circuit. These designs may reduce the electromagnetic noise by producing synchronized, out-of-phase noises with matched coupling coefficients that result in at least partial cancellation of the noise transferred to a certain location.

Figure 1:
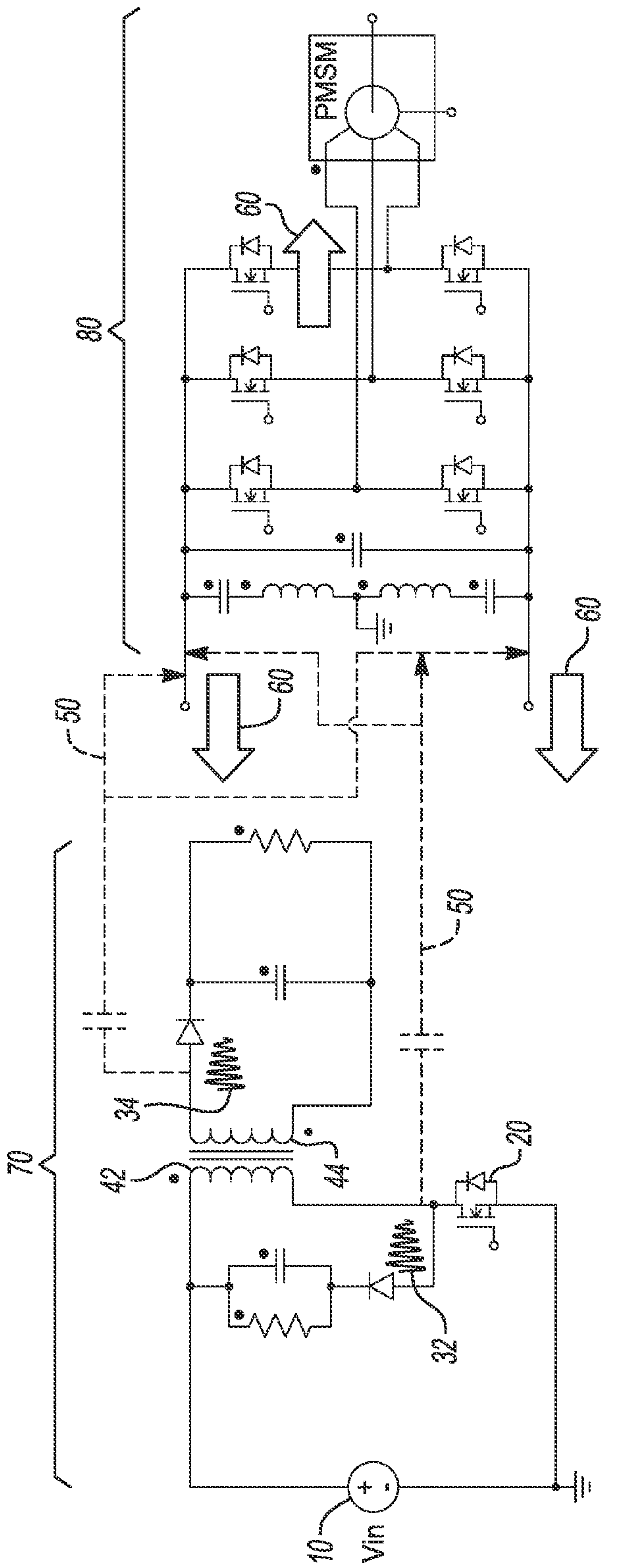
FIG. 1 is a schematic diagram of an automotive power circuit illustrating noise generation and propagation.

FIG. 1 shows an example of noise generation and propagation within an automotive power system. In other words, FIG. 1 illustrates an issue the contents of this disclosure mitigates.

The left portion of FIG. 1 shows a flyback converter 70. The flyback converter 70 includes a power supply 10, a switch 20, and a transformer including primary winding 42 and secondary winding 44. The rapid operation of the switch 20 generates electromagnetic noise 32. The electromagnetic noise 32 can propagate from the primary winding 42 to the secondary winding 44 to become a secondary-side electromagnetic noise 34. The noises 32, 34 are drawn as a decaying sinus waveform, but the noises 32, 34 may take any waveform.

The circuit connected to the primary winding 42 could be replaced with different components and in some situations, the electromagnetic noise 32 could still propagate to become the secondary-side electromagnetic noise 34. The circuit connected to the secondary winding 44 could be replaced with different components and in some situations, the electromagnetic noise 32 could still propagate to become the secondary-side electromagnetic noise 34.

The right portion of FIG. 1 shows a DC/AC bus 80. The DC/AC bus 80 is used here as an example of some other subsystem that may not intrinsically generate electromagnetic noise like the electromagnetic noise 32 of the flyback converter 70. Any other subsystem could replace the DC/AC bus 80, and the principles discussed here may hold.

FIG. 1 also shows parasitic coupling 50 between the flyback converter 70 and the DC/AC bus 80. The directionality of the parasitic coupling 50 is only meant to demonstrate that the electromagnetic noise 32 and the secondary-side electromagnetic noise 34 may transfer from the flyback converter 70 to the DC/AC bus 80 because of the parasitic coupling 50. Lastly, FIG. 1 shows that the electromagnetic noise 32 and the secondary-side electromagnetic noise 34 transferred from the flyback converter 70 to the DC/AC bus 80 may then propagate in a direction 60 to other connected subsystems not drawn.

In sum, FIG. 1 demonstrates that a first subsystem with fast voltage- or current-switching transitions that generates high frequency electromagnetic noise may cause noise to propagate through a separate, disconnected but parasitically coupled second subsystem. (This may be generalized to describe noise propagation over n connected or coupled subsystems). Electromagnetic compatibility (EMC) standards may apply to noise present in a subsystem, so noise propagating throughout a subsystem may cause a vehicle to not meet EMC standards.

Figure 2:
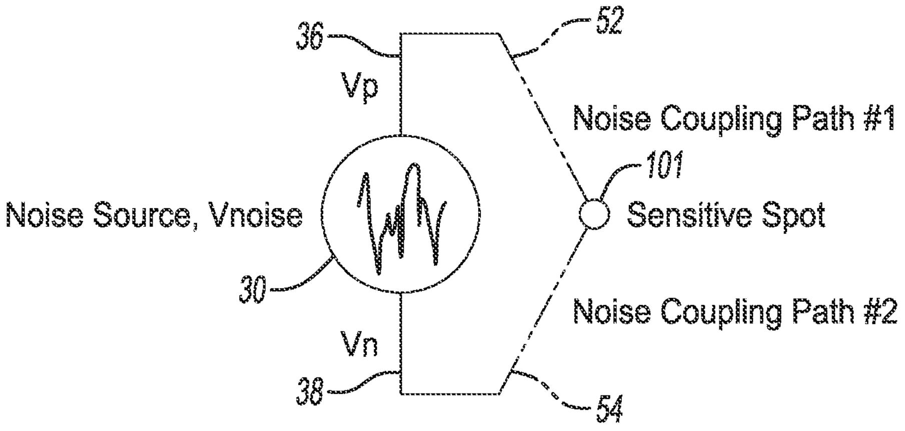
FIG. 2 is a schematic diagram illustrating noise coupling.

FIG. 2 shows a generalized example of the present disclosure. Consider some noise source 30 and a sensitive spot 101. The noise may travel in a first direction 36 and a second direction 38 throughout a circuit. The noise travelling in the first direction 36 and the noise travelling in the second direction 38 may have different phases. Based on the layout of the circuits containing the noise source and the sensitive spot, any of the following may occur due to coupling: (a) no noise from the noise source 30 may be detectible at the sensitive spot 101; (b) the noise travelling in the first direction 36 may be detectible at the sensitive spot 101 by propagation over a first coupling path 52; (c) the noise travelling in the second direction 38 may be detectible at the sensitive spot 101 by propagation over a second coupling path 54; or (d) both noises 36, 38 may be detectible at the sensitive spot 101 by propagation over a first coupling path 52 and a second coupling path 54, respectively. For this discussion, assume (d), and note the noises 36, 38 may be unequal.

According to the present disclosure, the circuit layout may be designed to reduce the detectability of the noise generated by the noise source 30 as measured over the sensitive spot 101. To achieve reduction, one might design the circuit such that the first coupling path 52 and the second coupling path 54 cause the noise travelling in the first direction 36 and the noise travelling in the second direction 38, possibly having different phases, to at least partially cancel when measured over the sensitive spot 101.

For example, consider that the noise source 30 generates a sine wave, that the first coupling path 52 and the second coupling path 54 are the same distance and contain the same media, and that the circuitry is symmetric to the sensitive spot 101 as depicted in FIG. 1. Under these presumptions, no noise should be measurable at the sensitive spot 101 because the noise from the first coupling path 52 and the noise from the second coupling path 54 should arrive at the sensitive spot 101 with equal magnitude but opposite phase.

The example of FIG. 2 may be further generalized to sets of circuits containing any number of noise sources 30, any number of sensitive spots 101, and any geometry. For any combination of these variables, some configuration exists to optimize some minimization criteria for the noise detectible over the sensitive spots 101.

Figure 3:
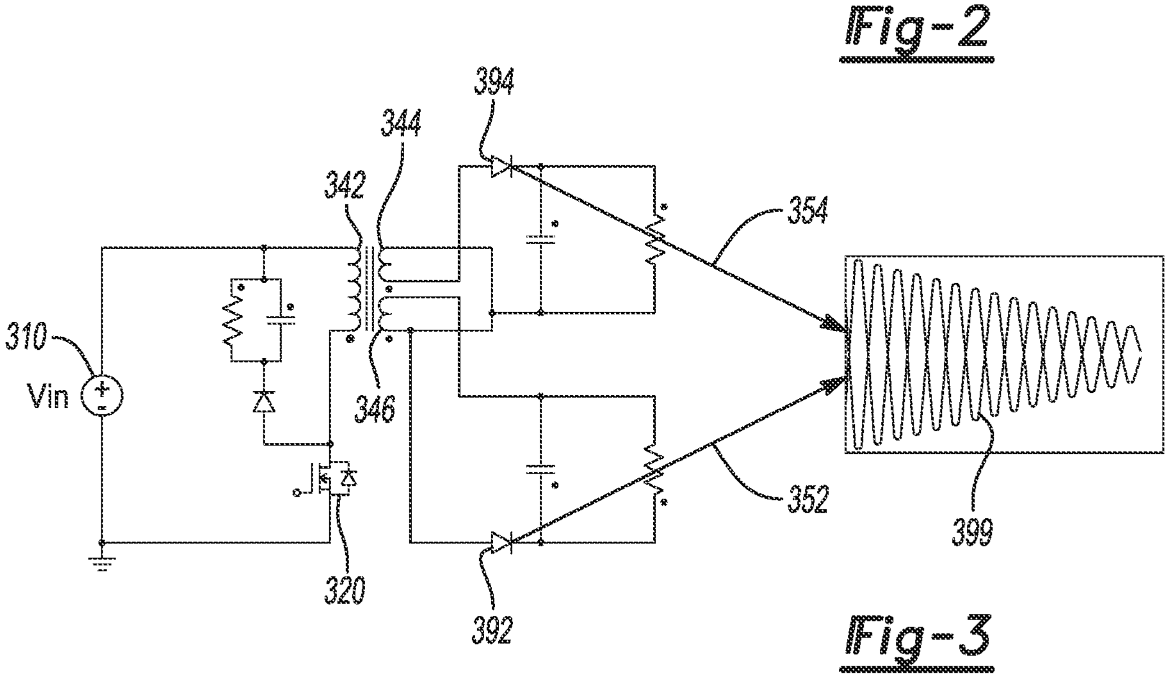
FIGS. 3 and 4 are schematic diagrams of switch mode power converters with components arranged to facilitate noise cancellation.

FIG. 3 shows a circuit including an embodiment of noise mitigation design. The circuit includes a power supply 310 connected to a switch 320 and primary winding 342. The circuit includes dual secondary windings: a top winding 344 and a bottom winding 346. The top winding 344 and the bottom winding 346 have the same directionality as noted by dots on the figure. The circuit further includes a top rectifying diode 394 directly connected to the top winding 344 and a bottom rectifying diode 392 directly connected to the bottom winding 346. The dotted side of the top winding 344 directly connects to the anode of the top rectifying diode 394. The dotted side of the bottom winding 346 directly connects to the anode of the bottom rectifying diode 392.

Consider electromagnetic noise generated by the switch 320. In the way discussed for FIG. 1, this electromagnetic noise may transfer from the primary winding 342 to each of the top winding 344 and the bottom winding 346 and propagate throughout the circuits attached to the top winding 344 and bottom winding 346. Noise transferred in this way measured at the top rectifying diode 394 and the noise measured at the bottom rectifying diode 392 may have different phases or opposite polarities.

FIG. 3 also shows noise over the top rectifying diode 394 travelling along a top coupling 354 to a sensitive spot or other point of interest. Similarly, noise over the bottom rectifying diode 392 is depicted travelling along a bottom coupling 352 to the sensitive spot or other point of interest. Lastly, FIG. 3 shows that by carefully designing the circuit, noise cancellation 399 over the sensitive spot or other point of interest may occur. The circuits connected to the primary windings 342, the top windings 344, and bottom windings 346 may comprise a switch mode power converter, a flyback converter, or may be different than depicted and the noise mitigation may still be present. This design concept may be generalized to any number of noise sources or points of interest and to any geometry.

In some embodiments, each of the circuits connected to the top winding 344 and the bottom winding 346 may include capacitors that share nodes with the rectifying diodes 394, 392 as depicted. In some embodiments, the switch 320 connects the primary windings 342 and the power supply 310 as depicted. In some embodiments, the switch 320 may also connect directly to a dotted terminal of the primary coil as depicted. In some embodiments, a positive terminal of the power supply 310 directly connects to a non-dotted terminal of the primary windings 342. In some embodiments, the circuit connected to the primary windings 342 may include snubber circuitry.

Figure 4:
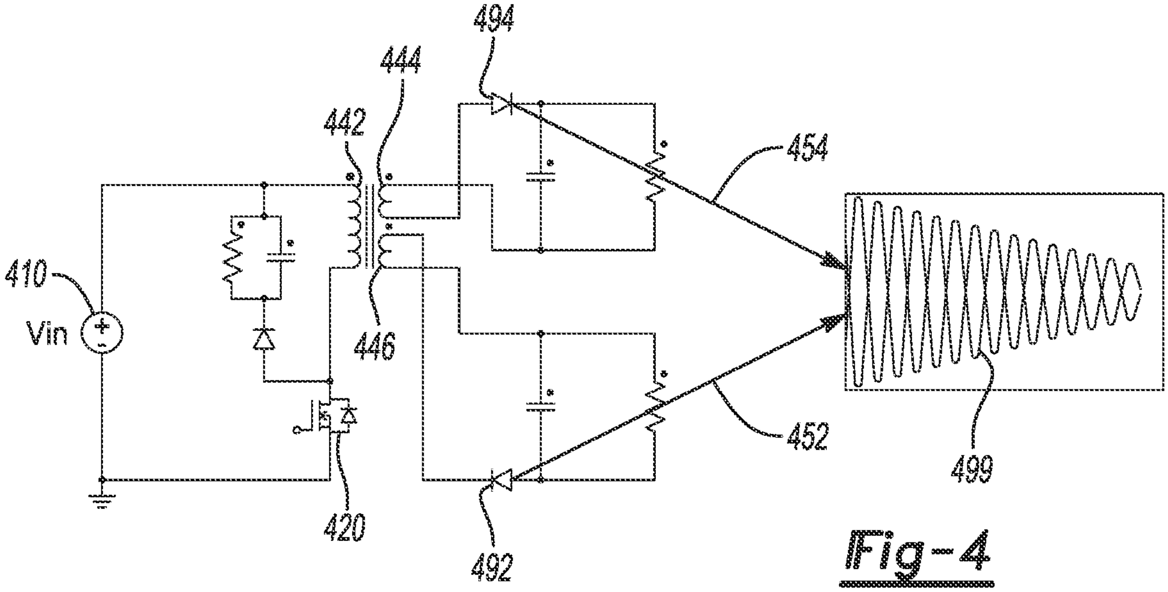

FIG. 4 shows a circuit including another embodiment of noise mitigation design. The circuit includes a power supply 410 connected to a switch 420 and primary winding 442. The circuit includes dual secondary windings: a top winding 444 and a bottom winding 446. The top winding 444 and the bottom winding 446 have the same directionality as noted by dots on the figure. The circuit further includes a top rectifying diode 494 directly connected to the top winding 444 and a bottom rectifying diode 492 directly connected to the bottom winding 446. The non-dotted side of the top winding 444 directly connects to the anode of the top rectifying diode 494. The dotted side of the bottom winding 446 directly connects to the cathode of the bottom rectifying diode 492.

Consider electromagnetic noise generated by the switch 420. In the way discussed for FIG. 1, this electromagnetic noise may transfer from the primary windings 442 to each of the top winding 444 and the bottom winding 446 and propagate throughout the circuits attached to the top winding 444 and bottom winding 446. Noise transferred in this way measured at the top rectifying diode 494 and the noise measured at the bottom rectifying diode 492 may have the same phase or polarity.

FIG. 4 also shows noise over the top rectifying diode 494 travelling along a top coupling 454 to a sensitive spot or other point of interest. Similarly, noise over the bottom rectifying diode 492 is depicted travelling along a bottom coupling 452 to the sensitive spot or other point of interest. Lastly, FIG. 4 shows that by carefully designing the circuit, noise cancellation 499 over the sensitive spot or other point of interest may occur. The circuits connected to the primary winding 442, the top winding 444, and bottom winding 446 may comprise a switch mode power converter, a flyback converter, or may be different than depicted and the noise mitigation may still be present. This design concept may be generalized to any number of noise sources or points of interest and to any geometry.

In some embodiments, each of the circuits connected to the top winding 444 and the bottom winding 446 may include capacitors that share nodes with the rectifying diodes 494, 492 as depicted. In some embodiments, the switch 420 connects the primary windings 442 and the power supply 410 as depicted. In some embodiments, the switch 420 may also connect directly to a non-dotted terminal of the primary coil as depicted. In some embodiments, a positive terminal of the power supply 410 directly connects to a dotted terminal of the primary windings 442. In some embodiments, the circuit connected to the primary windings 442 may include snubber circuitry.

Figure 5:
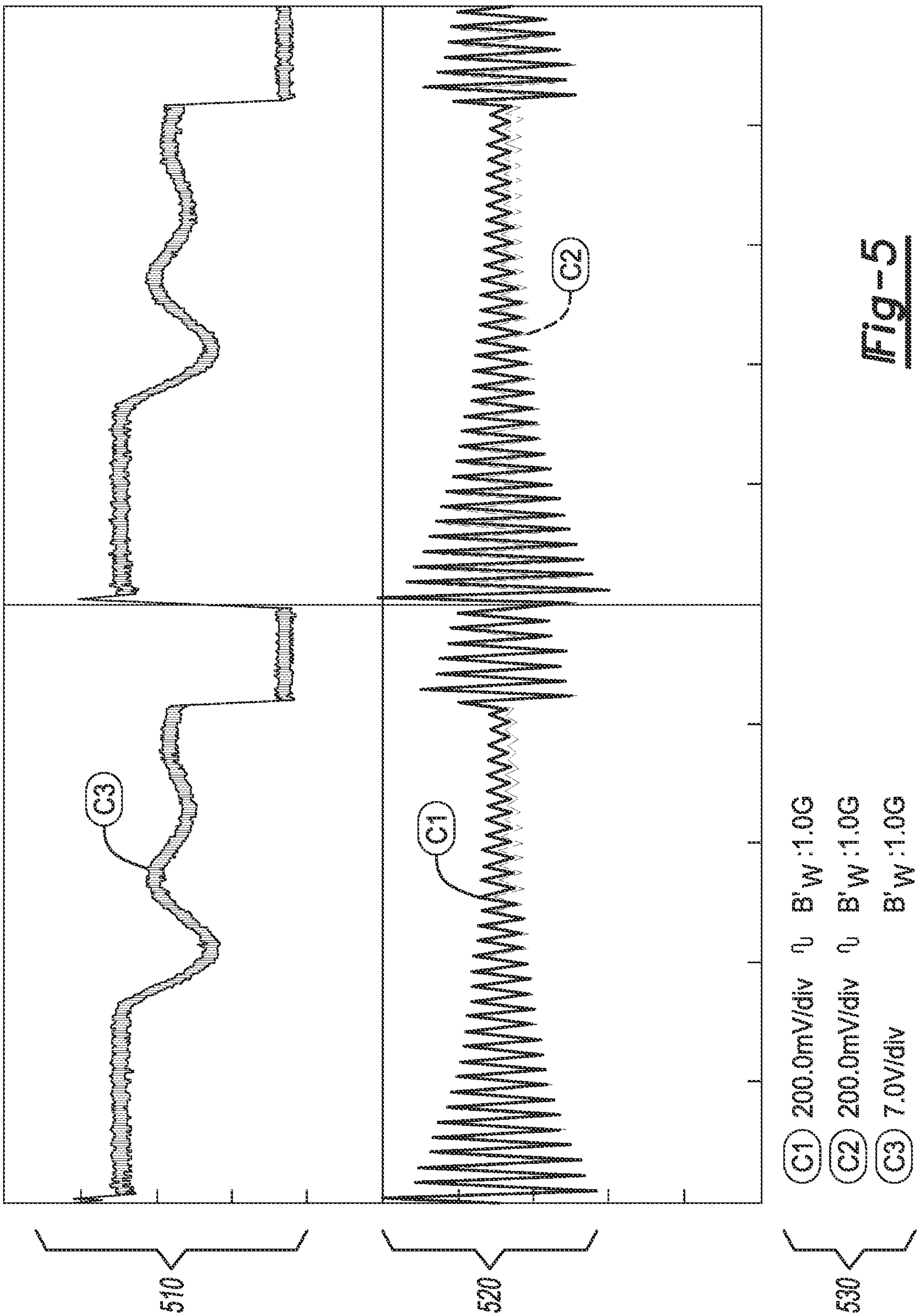
FIG. 5 is a plot of a switching waveform and corresponding noise without use of the component placement strategies described herein.
Figure 6:
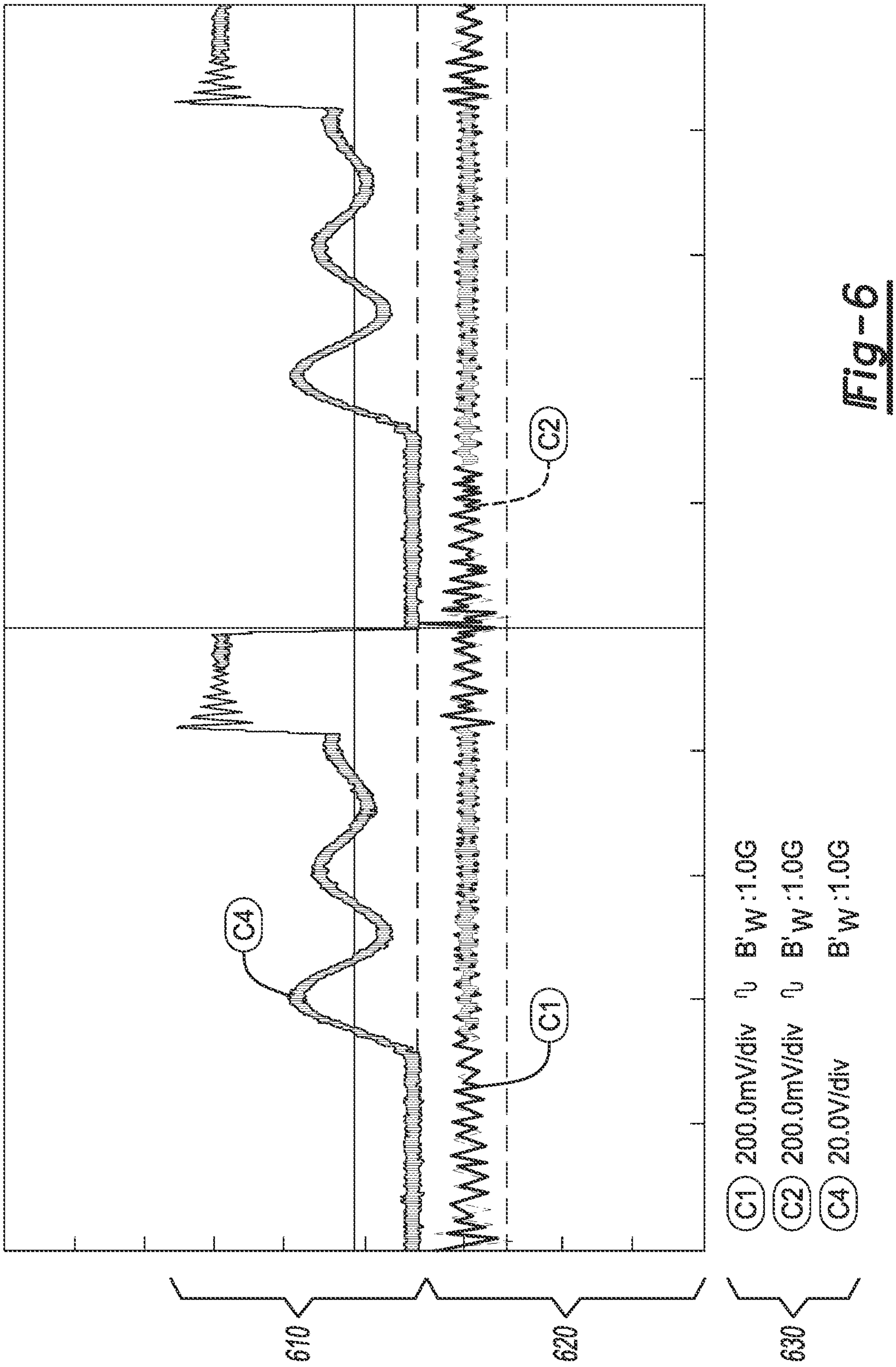
FIG. 6 is a plot of a switching waveform and corresponding noise with use of the component placement strategies described herein.

FIG. 5 shows an experimental output for a circuit without noise-mitigating design, and FIG. 6 shows an experimental output for a circuit including noise-mitigating design. Specifically, FIG. 5 was an original result, and FIG. 6 was a result after moving a diode from an output-positive side to a negative side. FIG. 5 is intended to be compared against FIG. 6.

FIG. 5 includes a MOSFET switching waveform 510 and a measured noise 520. FIG. 5 also includes a scale 530. The scale 530 notes that the MOSFET switching waveform 510 is depicted at 7.0 V/div and the measured noise 520 is depicted at 200.0 mV/div. On FIG. 5, where the MOSFET switching waveform 510 shows a rapid change of voltage, the measured noise 520 shows a corresponding transient.

FIG. 6 includes a diode switching waveform 610 and a measured noise 620. FIG. 6 also includes a scale 630. The scale 630 notes that the diode switching waveform is depicted at 20.0 V/div and the measured noise 620 is depicted at 200.0 mV/div. On FIG. 6, where the diode switching waveform 610 shows a rapid change of voltage, the measured noise 620 shows a corresponding transient. The transients of FIG. 6's measured noise 620 are smaller than the transients of FIG. 5's measured noise 520.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials.

As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. Automotive power electronics comprising:

a switch mode power converter including a transformer with a primary coil and a pair of secondary coils in phase with the primary coil, and a pair of output circuits defining a pair of opposite polarity outputs, each of the output circuits including a rectifying diode having an anode directly connected with a dotted terminal of one of the secondary coils such that electromagnetic noise generated by the rectifying diodes at least partially cancels.

2. The automotive power electronic of claim 1, wherein each of the output circuits includes a capacitor having a terminal that shares a node with one of the rectifying diodes.

3. The automotive power electronics of claim 1, wherein the switch mode power converter includes an input power source and a power switch connected between the primary coil and input power source.

4. The automotive power electronics of claim 3, wherein the power switch is directly connected with a dotted terminal of the primary coil.

5. The automotive power electronics of claim 3, wherein the input power source includes a positive terminal directly connected with a non-dotted terminal of the primary coil.

6. The automotive power electronics of claim 1, wherein the switch mode power converter further includes snubber circuitry.

7. The automotive power electronics of claim 1, wherein the switch mode power converter is a flyback switch mode power converter.

8. Automotive power electronics comprising:

a switch mode power converter including a transformer with a primary coil and a pair of secondary coils in phase with the primary coil, and a pair of output circuits defining a pair of same polarity outputs, one of the output circuits including a rectifying diode having an anode directly connected with a non-dotted terminal of one of the secondary coils and the other of the output circuits including a rectifying diode having a cathode directly connected with a dotted terminal of the other of the output circuits such that electromagnetic noise generated by the rectifying diodes at least partially cancels.

9. The automotive power electronic of claim 8, wherein each of the output circuits includes a capacitor having a terminal that shares a node with one of the rectifying diodes.

10. The automotive power electronics of claim 8, wherein the switch mode power converter includes an input power source and a power switch connected between the primary coil and input power source.

11. The automotive power electronics of claim 10, wherein the power switch is directly connected with a non-dotted terminal of the primary coil.

12. The automotive power electronics of claim 10, wherein the input power source includes a positive terminal directly connected with a dotted terminal of the primary coil.

13. The automotive power electronics of claim 8, wherein the switch mode power converter further includes snubber circuitry.

14. The automotive power electronics of claim 8, wherein the switch mode power converter is a flyback switch mode power converter.

15. Automotive power electronics comprising:

a switch mode power converter including a pair of output circuits each with an output and a rectifying diode arranged such that electromagnetic noise generated by the rectifying diodes at least partially cancels.

16. The automotive power electronics of claim 15, wherein the switch mode power converter includes a transformer with a primary coil and a pair of secondary coils, and wherein anodes of the rectifying diodes are directly connected with dotted terminals of the secondary coils.

17. The automotive power electronics of claim 15, wherein the switch mode power converter includes a transformer with a primary coil and a pair of secondary coils, and wherein a cathode of at least one of the rectifying diodes is directly connected with a dotted terminal of one of the secondary coils.

18. The automotive power electronics of claim 15, wherein the outputs are of opposite polarity.

19. The automotive power electronics of claim 15, wherein the outputs are of same polarity.

* * * * *